United States Patent

Long

[15] 3,647,409

[45] Mar. 7, 1972

[54] METHOD AND APPARATUS FOR HEAT TREATING GLASS SHEETS ON MOLTEN METAL

[72] Inventor: Bernard Long, Paris, France

[73] Assignee: Libbey-Owens-Ford Company, Toledo, Ohio

[22] Filed: Sept. 23, 1969

[21] Appl. No.: 860,201

[30] Foreign Application Priority Data

Sept. 24, 1968 France..................................167,397

[52] U.S. Cl. ................................65/117, 65/99 A, 65/111, 65/116, 65/182
[51] Int. Cl. ......................................................C03b 25/02
[58] Field of Search ..............65/99 A, 182 A, 114, 116, 182, 65/111, 117

[56] References Cited

UNITED STATES PATENTS 3,151,366 10/1964 Fromson..................................164/73
3,445,213 5/1969 Long..................................65/99 A X Primary Examiner—Arthur D. Kellogg
Attorney—Collins and Oberlin

[57] ABSTRACT

Removing defects in surface planimetry from a glass sheet by depositing the sheet on a layer of molten metal which it does not wet within a mold of corresponding interior configuration. A uniform pressure greater than that necessary to maintain in equilibrium a thickness of liquid glass equal to the thickness of the sheet is applied to its upper surface by a plate or second layer of molten metal not wetted by the glass, and the sheet is heated to give is a viscosity between $10^5$ and $10^7$ C.G.S. units. After the defects are eliminated by the action of surface tension, the confining layers are cooled so as to cool the sheet. By rapidly cooling the confining layers, the sheet can also be tampered.

15 Claims, 5 Drawing Figures

INVENTOR.
Bernard Long
BY
Collins & Oberlin
ATTORNEYS

METHOD AND APPARATUS FOR HEAT TREATING GLASS SHEETS ON MOLTEN METAL

One knows that the surfaces of continuous drawn glass sheets are characterized:
on the other hand, by an excellent polish called "fire polish"
on the other hand by a defective planimetry.

One knows also that the defects of planimetry are in general in the form of oriented undulations of which the most current are "stria" and "hammering."

In the course of recent decades, the producers of continuous drawn glass sheets have considerably reduced these undulations but one should however emphasize:
that for a given thickness, the best results obtained in vertical drawing cannot rival those of horizontal drawing recently applied to "float" glass.
that it has still not been possible to standardize the best results which in fact only represent a limited percent of current production.

To be objective, in the range of low thickness, horizontal drawing applied to "float" glass has not produced up to the present satisfactory surfaces except to a thickness near 3 mm. and as one can predict that if this mode of drawing produces a continuous sheet of 2 mm. thickness having surfaces of better planimetry than the surface of continuous sheets produced by vertical drawing, the planimetry of such a continuous sheet still is not satisfactory.

From the above considerations we can conclude that the following question is a real one.

Is it possible to fully improve glass sheets cut in continuous sheets produced by vertical or horizontal drawing? In other words can one give these sheets an excellent planimetry not only for thickness included between 3 and 6 mm. but also for any thickness included between about 3 mm. and a few tenths of a millimeter?

The present invention proposes to solve this problem; it has therefore for its object to eliminate the defects of planimetry of sheets having "fire polish" whatever their commercial thickness whether these sheets are of the quality currently known as "drawn" glass or the quality which one can call "-float-drawn."

In order to avoid any misunderstanding, attention should be drawn to the fact that the present invention not only concerns perfecting continuous sheets but also any sheet of well-determined contour and dimension in current use, taken by cutting from such continuous sheets.

It should be added that the present invention not only proposes to improve the sheets in question by giving them an excellent planimetry, but also to give then a superimprovement by giving their edges rounded joints.

Finally, it must also be mentioned that the process which is the basis of the present invention ends normally in the possibility of tempering the sheets in question according to a known technique and this without increasing the cost of production to an important extent.

The totality of the advantages mentioned above results in the fact that the sheets treated in accordance with the process of the present invention have for the principal applications:
on the one hand, safety glazings for automobiles: those which are constituted by a relatively thick tempered sheet and those of the "sandwich" type, including one or two strongly tempered sheets.
on the other hand safety glazings used in modern construction in the form of doors, partitions, etc.

It has already been proposed to fabricate, by molding liquid glass taken from a furnace, sheets of well-determined thickness and contour whose surfaces have fire polish and an excellent planimetry.

Such a fabrication, which is limited to mass applications, obviously cannot satisfy the requirement for limited quantities of sheets cut from large sheets of standard dimensions to be supplied to distributors situated between the plant and the users.

It is clear that the process of the present invention by eliminating the defects of planimetry of any sheet which has been cut to its dimensions of use from a continuous sheet of drawn glass, and that without its thickness being modified, gives a manufacturer great flexibility and a substantial profit in perfecting the defective part of his production which would be sold at low price or broken up.

The process of the present invention is based on the leveling under heat of the defects of planimetry of the surfaces by maintaining the sheet between two layers of melted metal, in the interior of a mold whose walls are not wetted by the glass or by the melted metal.

This process includes the succession of the following operations:

1. On the flat and horizontal bottom of a mold heated in a nonoxidizing atmosphere, a mold which is made of a material not wetted by the glass and the melted metals and which has a straight interior section whose contour is when hot superposable on that of the sheet with sharp edges to be treated, one puts a layer of melted metal whose thickness is at least equal to the thickness of equilibrium which takes the melted metal applied when it spreads on the bottom of the molds and conforms on all sides to its interior contour under the sole intervention of gravity and surface tension.
2. On this layer of melted metal, one places the sheet to be treated and on it, one places a plate of the same horizontal contour as the sheet, a plate whose lower surface plane and horizontal is made of a material which is not wetted by the softened or liquid glass. The thickness of this plate is such that the total uniform pressure exercised on the upper surface of the sheet is substantially greater than the pressure necessary to maintain in equilibrium a thickness of liquid glass equal to the initial thickness of the sheet.
3. One heats the sheet rapidly in order to give it a viscosity included approximately between $10^5$ and $10^7$ C.G.S. units (poise) and to permit its periphery to enter on all sides in contact with the interior surface of the mold.
4. One then withdraws the pressure plate and replaces it rapidly with a uniform layer of liquid metal whose thickness satisfies the two following conditions:
   a. it is at least equal to the thickness of equilibrium which this liquid metal takes in contact with a horizontal layer of glass under the sole intervention of gravity and of surface tension.
   b. It exercises a uniform pressure substantially greater than the pressure necessary to maintain in equilibrium the thickness of the glass of the sheet.
5. After by the intervention of the intersurface tension between the liquid glass and the melted metal, the initial defects of planimetry are eliminated, and on the other hand, the edges of the sheet are rounded under the action of the surface tension, one rapidly cools the two layers of metal which surrounded the sheet, which assists in making their planimetry perfect, cooling which one continues to a temperature situated below the "strain-point" of the glass but, however, greater than the temperature of solidification of the metal, thus giving the sheet a strong temper while keeping the metal in a liquid state.
6. One then pours the melted metal into an auxiliary container and the sheet whose surfaces are remarkably plane and strongly tempered is extracted from the mold and from the enclosure with the nonoxidizing atmosphere.

To effect the above process one generally uses a mold of graphite placed in an enclosure whose nonoxidizing atmosphere is composed of a mixture of nitrogen and hydrogen.

According to a known device one can eliminate the graphite floor of the mold and avoid the use of a layer of melted metal on this floor. For this the mold is made of a single frame of graphite of sufficient height placed on the surface of a bath of melted metal contained in a tank of refractory material.

It being given:
that the sheet is cut at room temperature;

that the leveling of the undulations of its surfaces is effected when the glass possesses a viscosity included between $10^5$ and $10^7$ C.G.S. units, that is to say at a temperature included approximately between 930° and 730° C., there is evidently occasion to take account of the expansion of the mold and that of the glass so that the sheet in a viscous state is on all sides in contact with the interior surface of the mold.

The expansion of the graphite being much less than that of the glass, it is clear that the interior dimensions of the mold at room temperature should be slightly greater than those of the sheet. An elementary computation makes it possible to determine the interior dimensions of the mold as a function of the dimensions of the sheet to the treated and the preceding considerations.

The graphite pressure plate which one puts on the sheet during its heating, evidently has the role of preventing an increase in the thickness of the sheet at high temperature when, as is generally the case, the initial thickness is less than the thickness of equilibrium, which is about 6 mm. under a single atmospheric pressure.

After being certain that the glass will cover at high temperature the whole section of the mold, it is advisable to give the pressure plate a thickness greater than that which is strictly necessary to maintain the initial thickness.

The melted metal used is generally melted tin which is particularly suitable for the following reasons:
  its melting point (232° C.) is well below the "strain-point" of the glass (about 500° C.);
  it does not alter the glass to a perceptible extent in the zone of the temperature where it is in contact with it.
  its cost is moderate It is interesting to recall here:
  that under atmospheric pressure, the thickness of equilibrium of a layer of melted tin spread on a horizontal surface which it does not wet is about 4.6 mm.
  that under atmospheric pressure increased by a layer of tin having a thickness of 4.6 mm., the thickness of equilibrium of industrial sodo-calcis glasses is about 2.6 mm.

One sees therefore that to treat sheets of a thickness less than 2.6 mm. by the process of the present invention, it is suitable to substitute for the pressure exercised by the graphite plate, a layer of melted tin having a suitable thickness necessarily greater than 4.6 mm. in order to avoid the risk of an increase in the thickness of the sheet in the course of treatment, an eventuality, in reality, rather improbable in view of the small amount of time required to eliminate the defects of planimetry of the sheet.

For all sheets of a thickness greater than 2.6 mm., a layer of melted tin of 4.6 mm. thickness makes it possible to eliminate the defects of planimetry without the least risk of increasing the thickness of the sheet.

The pressure plate can be of solid graphite when one treats sheets of a thickness included between 3 and 6 mm. since then the thickness of the plate scarcely excedes 10 cm. but to treat sheets of a thickness less than 2 mm., it is indicated to adopt a composite plate whose lower part in contact with the glass is of graphite, the upper part being made of a much more dense material than the graphite for example of stainless steel.

In the case where the distance between the interior contour of the mold and that of sheet is provided with sufficient precision so that by the action of expansion, the marginal zone of the sheet comes in contact with the interior contour of the mold, one can without disadvantage eliminate the pressure plate and immediately put on a layer of metal of suitable thickness.

As has been mentioned previously, the leveling of the undulations of the surfaces of the sheet is effected:
  on the one hand, thanks to the intervention of the surface tension between the glass and the melted metal while the sheet is at a high temperature between the two layers of melted metal.
  on the other thanks to the sudden placing in extension caused by their cooling during the first stage of the tempering.

This cooling is effected in a known manner by actively cooling the melted metal which bathes the surfaces, for example by contact with metallic elements, themselves cooled by the circulation of water.

In the case where the bottom of the mold for treatment of the sheet is replaced by a part of the free surface of a bath of melted metal, the process of the present invention can be effected in a semicontinuous manner by the use of a chain of mold frames which one moves from one end to the other of a tank of melted metal, each frame having a sheet to be treated in its interior.

The sheets are then successively put in place at one end of the tank and they are successively removed at the other end after their surfaces have been planed and tempered.

In this semicontinuous fabrication, the frames are generally simple graphite frames attached to each other in succession. The metal used is melted tin and one maintains above the tin bath, a nonoxidizing atmosphere composed of a mixture of nitrogen and hydrogen.

The process of the present invention has essentially for its object the elimination of the undulations of the surface of drawn glass sheets whose surfaces have "fire polish" but one conceives easily that it can be applied with success to sheets which one cuts in continuous sheets obtained by rolling, that is to say more precisely by "drawing-calibrating," the calibrating being effected by means of rollers with smooth surface.

In addition to the defect of "hammering" the surfaces of these sheets carry the replica of the "machining grain" of the calibrating rollers and because of this fact, they diffuse light. This peculiar defect of planimetry is of course more difficult to cause to disappear than the undulations of drawn glass which already possess "fire polish" but full success is attainable.
  either by increasing the time during which the sheet if imprisoned between the two layers of melted metal.
  or by reducing the viscosity of the glass, that is to say by raising the temperature, for example up to around 1,000° C.

To better understand the invention, one will describe as follows as an illustration and without any limiting character, examples of application shown in the attached drawing, in which:

FIGS. 1a, 1b, 1c represent vertical sections of the mold and of the treated sheets at three instants in the operation of the process according to the invention, that is;
  immediately after the depositing of the sheet on the layer of melted metal which covers the bottom of the mold.
  when the sheet enters into contact with the frame of the mold with its rounded edges.
  when the pressure plate having been withdrawn, the upper surface of the sheet has been covered with a layer of melted metal.

Figure 1A:
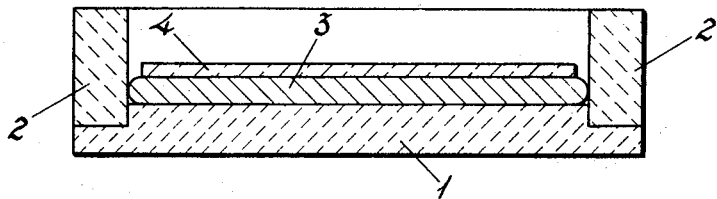
Figure 1B:
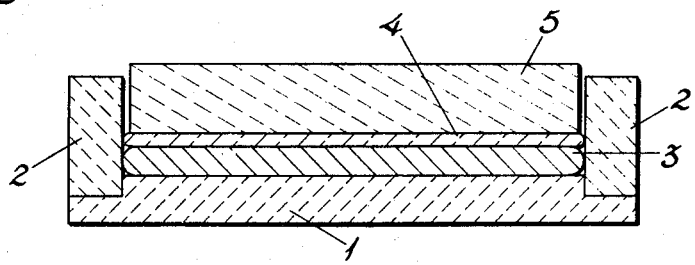
Figure 1C:
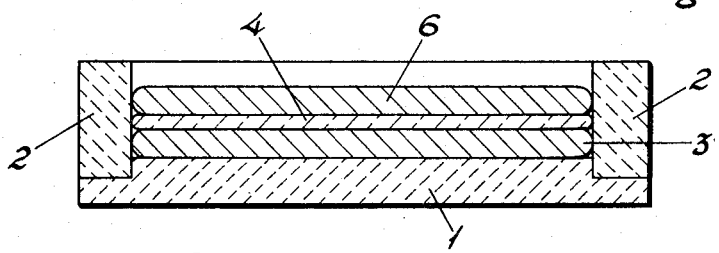
Figure 2:
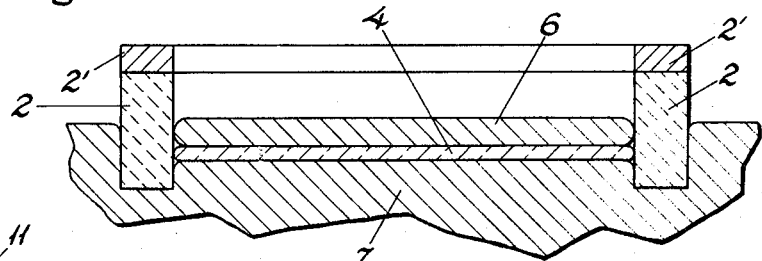
FIG. 2 shows the vertical section of a sheet in the course of treatment in the interior of a frame placed on the bath of melted metal.

In the FIGS. 1a, 1b, 1c, the bottom of the mold of graphite is designated by the reference 1, the graphite frame of the mold by the reference 2 and the horizontal layer of melted tin which covers the bottom of the mold by the reference 3. This layer generally has the thickness of equilibrium of melted tin which spreads on a plane and horizontal surface of graphite at atmospheric pressure, under the sole action of gravity and surface tension, that is to say about 4.6 mm.; it can evidently be thicker.

The mold is placed in a chosen enclosure (not shown) which is heated by resistances and in which one maintains a nonoxidizing atmosphere by circulating there a mixture of nitrogen and hydrogen.

In FIG. 1a, the sheet to be treated 4 has just been deposited on the layer of melted tin 3. The edges of this sheet are rough cut and one acts so that its contour at the instant when it is put in place is a slight computed distance away from the interior horizontal contour of the frame 2.

In FIG. 1b, when the mold and the sheet uniformly loaded with the graphite pressure plate 5 have been heated to a temperature included between about 730° and 930° C., the contour of the sheet under the effect of the expansion and the pressure of the plate 5 is in contact with the interior surface of the frame 2.

It should be recalled here that the plate 5 exercises on the glass a uniform pressure which is slightly higher than the pressure of equilibrium which would be strictly necessary to maintain the initial thickness.

To be exact, the actual thickness of the sheet is evidently increased by the fact of its expansion, but since this increase is less than one percent of its initial amount, one can disregard it.

In FIG. 1c, the pressure plate is replaced by a layer 6 of melted tin, having the thickness of equilibrium (about 4.6 mm.).

As has been mentioned before, in commenting on the process of the present invention, the pressure which this thickness of melted tin exercises in addition to atmospheric pressure is sufficient to prevent an increase in thickness of any sheet of a thickness greater than about 2.6 mm. This is the case of the sheet shown in FIGS. 1a, 1b, 1c whose thickness is 3 mm.

For sheets with a thickness less than 2.6 mm. it is necessary, in order that the thickness shall not increase, to use a pressure plate and then a layer of melted tin which is thicker in proportion as the thickness of the glass is less.

As regards the pressure plate, it is indicated to diminish its size in height by using graphite only for its lower part, its upper part being then made of a denser material than graphite, for example stainless steel.

The frame is placed on the surface of a bath of melted tin 7 and one acts so that it penetrates into this bath to a height such that the edges of the sheet 4, of a thickness of 3 mm. are in contact with the interior surfaces of the frame 2.

Figure 3:
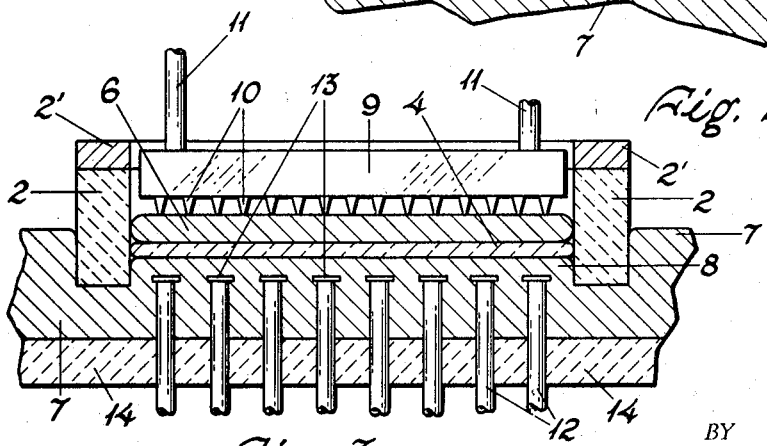
FIG. 3 shows the vertical section of one of the molds of a chain of semicontinuous treatment, the said mold having reached the position where the tempering of the sheet is effected, after having passed through a certain number of positions all along the surface of a bath of melted metal.

In FIG. 3, the glass sheet 4 is in a tempering position in the interior of the graphite frame 2 which has been moved on the surface of the bath of melted tin 7 in course of the operations preceding the tempering.

One tempers the sheet in a known manner by actively cooling the melted tin which bathes its surfaces, that is to say:
the layer 6 which covers its upper surface;
the layer 8 which supports its lower surface.

The cooling of the layer 6 of melted tin is effected by bringing into contact with it numerous points 10 which are brazed on to the lower surface of the water circulation box 9 of brass. For this one moves it vertically by means of tubes 11 through which the entry and exit of the cooling water occurs.

The cooling of the layer of melted tin 8 is effected by means of the small plaques brazed on the ends of the brass pipes 12. Cooling water arrives by tubes (not shown) placed along the axes of the pipes 12. It then flows in contact with the interior surface of these tubes.

To temper the low surface of the sheet 4, one pushes upward the unit of tubes 12 which traverse vertically the graphite floor 14.

As has been mentioned previously, the process according to the invention makes it possible to give thin sheets of drawn glass, in particular of a thickness less than 1 mm., surfaces of excellent planimetry and to give them an extremely strong temper while retaining an excellent planimetry.

Apart from their remarkable optical properties, such sheets because of their strong temper and their small thickness can undergo considerable distortions without breaking and in case of rupture they fragment into inoffensive grains.

This is why associated with relatively thick sheets of plastic material, they make it possible to fabricate composite sheets of the sandwich type giving exceptional safety as glazings for automotive vehicles.

I claim:

1. In a method of improving the surface quality of an individual sheet of glass, the improvement comprising the steps of depositing the individual sheet on a layer of molten metal which it does not wet within a mold having an interior configuration corresponding to the peripheral outline of said sheet, said sheet having a thickness less than its normal equilibrium thickness on said molten metal, depositing a body which the glass will not wet on and substantially covering said sheet so as to apply thereto a uniform pressure at least as great as the pressure required to maintain in equilibrium a thickness of liquid glass equal to the initial thickness of said sheet, heating said sheet to a temperature at which it has a viscosity between about $10^5$ and $10^7$ C.G.S. units whereby surface defects in said sheet are eliminated under the action of surface tension, and thereafter cooling said sheet so that it can be extracted from said mold.

2. A method of improving the surface quality of a sheet of glass as claimed in claim 1, in which said mold is slightly larger than said sheet as it is deposited therein whereby said sheet expands as it is heated so that its peripheral edges just contact said mold.

3. A method of improving the surface quality of a sheet of glass as claimed in claim 1, including the step of maintaining a nonoxidizing atmosphere around said mold containing said molten metal layer, sheet, and pressure-applying body.

4. A method of improving the surface quality of a sheet of glass as claimed in claim 1, in which applying said pressure comprises depositing a pressure plate on said sheet.

5. A method of improving the surface quality of a sheet of glass as claimed in claim 1, in which applying said pressure comprises depositing a layer of molten metal on said sheet.

6. A method of improving the surface quality of a sheet of glass as claimed in claim 1, in which said pressure is applied on said sheet by depositing a pressure plate thereon and, after said sheet is heated, removing said pressure plate and depositing a layer of molten metal thereon.

7. A method of improving the surface quality of a sheet of glass as claimed in claim 1, in which said sheet is cooled by cooling said layer of molten metal and said body which applies said pressure.

8. A method of improving the surface quality of a sheet of glass as claimed in claim 7, in which said sheet is rapidly cooled by said layer and said body to a temperature below its strain whereby said sheet is tempered.

9. In apparatus for improving the surface quality of an individual glass sheet having a thickness less than its normal equilibrium thickness when supported upon a layer of molten metal which it does not wet, the improvement comprising a mold having upstanding walls defining a configuration corresponding to the peripheral outline of said individual sheet, a layer of molten metal which the glass will not wet within said mold, said sheet resting on said molten metal layer, a body which the glass will not wet bearing against and substantially covering the upper surface of said sheet, said body exerting a uniform pressure on said sheet at least as great as the pressure required to maintain in equilibrium a thickness of molten glass equal to the thickness of said sheet, and means for heating said sheet within said mold to a temperature at which it has a viscosity between about $10^5$ and $10^7$ C.G.S. units.

10. Apparatus for improving the surface quality of a glass sheet as claimed in claim 9, in which said upstanding walls of said mold facing said sheet are formed of graphite.

11. Apparatus for improving the surface quality of a glass sheet as claimed in claim 9, in which said flat surface of said body contacting said sheet if formed of graphite.

12. Apparatus for improving the surface quality of a glass sheet as claimed in claim 9, in which said body includes a graphite portion comprising said flat surface and a layer of material more dense than graphite above said graphite portion to increase the weight of said body.

13. Apparatus for improving the surface quality of a glass sheet as claimed in claim 9, wherein the bottom of said mold is open and said mold is partially submerged in a bath of molten metal to form said layer of molten metal therein upon which said sheet rests.

14. Apparatus for improving the surface quality of a glass sheet as claimed in claim 9, in which said body comprises a layer of molten metal resting on said sheet.

15. Apparatus for improving the surface quality of a glass sheet as claimed in claim 14, including means cooling said layers of molten metal above and beneath said sheet to thereby cool said sheet.

* * * * *